United States Patent
Yucra Rodriguez et al.

(10) Patent No.: US 11,423,432 B2
(45) Date of Patent: Aug. 23, 2022

(54) SYSTEM, METHOD AND COMPUTER-ACCESSIBLE MEDIUM FOR PROVIDING FINANCIAL ACCOUNT RECOMMENDATION BASED ON USE OF BENEFITS

(71) Applicant: Capital One Services, LLC, McLean, VA (US)

(72) Inventors: Jonatan Yucra Rodriguez, San Francisco, CA (US); Abdelkader Benkreira, Washington, DC (US); Joshua Edwards, Philadelphia, PA (US); Vu Nguyen, Pittsburg, PA (US); David Gabriele, New York, NY (US); Adam Vukich, Alexandria, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 41 days.

(21) Appl. No.: 16/853,877

(22) Filed: Apr. 21, 2020

(65) Prior Publication Data
US 2021/0326920 A1  Oct. 21, 2021

(51) Int. Cl.
*G06Q 30/00*  (2012.01)
*G06Q 30/02*  (2012.01)
(Continued)

(52) U.S. Cl.
CPC ........... *G06Q 30/0233* (2013.01); *G06F 9/54* (2013.01); *G06Q 30/0232* (2013.01); *G06Q 40/02* (2013.01)

(58) Field of Classification Search
None
See application file for complete search history.

(56) References Cited

U.S. PATENT DOCUMENTS 7,165,037 B2 *  1/2007  Lazarus ............... G06Q 30/02
                                              705/7.31
7,680,688 B2   3/2010  Hessburg et al.
(Continued)

FOREIGN PATENT DOCUMENTS

AU   2002325064 B2   10/2008
WO   2009085371 A1   7/2009

OTHER PUBLICATIONS

Information on NerdWallet.com, 2014, NerdWallet, Inc., printed through www.archive.org, date is in the URL in YYYYMMDD format. (Year: 2014).*

(Continued)

*Primary Examiner* — Naresh Vig
(74) *Attorney, Agent, or Firm* — Hunton Andrews Kurth LLP

(57) ABSTRACT

An exemplary system, method, and computer-accessible medium for providing a financial account recommendation to person(s) can include receiving a transaction history for the person(s) associated with a first financial account, determining first rewards information based on the transaction history, accessing database(s) containing rewards rates for a plurality of second financial accounts, determining second rewards information for a particular second financial account of the plurality of second financial accounts based on the transaction history, and providing the financial account recommendation to the person(s) to one of (i) keep the first financial account or (ii) switch to the second financial account based on a comparison of the first rewards information to the second rewards information.

20 Claims, 10 Drawing Sheets

(51) Int. Cl.
*G06F 9/54* (2006.01)
*G06Q 40/02* (2012.01)

(56) References Cited

U.S. PATENT DOCUMENTS

| | | | |
|---|---|---|---|
| 2002/0107731 A1 | 8/2002 | Teng | |
| 2005/0114211 A1 | 5/2005 | Amjadi | |
| 2005/0234697 A1* | 10/2005 | Pinto | G06Q 30/0254 703/22 |
| 2007/0198352 A1 | 8/2007 | Kannegiesser | |
| 2007/0260509 A1 | 11/2007 | Hines et al. | |
| 2008/0103968 A1 | 5/2008 | Bies et al. | |
| 2008/0319854 A1 | 12/2008 | Duroux et al. | |
| 2010/0057548 A1* | 3/2010 | Edwards | G06Q 30/02 705/14.13 |
| 2010/0250354 A1 | 9/2010 | Waucampt | |
| 2011/0106604 A1 | 5/2011 | Reuth et al. | |
| 2011/0137716 A1 | 6/2011 | Reuth et al. | |
| 2011/0137717 A1 | 6/2011 | Reuth et al. | |
| 2011/0238469 A1 | 9/2011 | Gershman et al. | |
| 2012/0066050 A1* | 3/2012 | Satyavolu | G06Q 30/0224 705/14.27 |
| 2012/0130785 A1 | 5/2012 | Postrel | |
| 2012/0303438 A1 | 11/2012 | Futty et al. | |
| 2013/0054338 A1 | 2/2013 | Merz | |
| 2013/0151325 A1 | 6/2013 | Poidomani et al. | |
| 2013/0159078 A1 | 6/2013 | Peck et al. | |
| 2013/0238408 A1 | 9/2013 | Cooke et al. | |
| 2015/0134438 A1 | 5/2015 | Chavarria et al. | |
| 2015/0170182 A1 | 6/2015 | Perez et al. | |
| 2015/0324830 A1* | 11/2015 | Chandrasekaran | G06Q 30/0226 705/14.27 |
| 2015/0339709 A1* | 11/2015 | Otto | G06Q 30/0253 705/80 |
| 2016/0379188 A1 | 12/2016 | Barton et al. | |

OTHER PUBLICATIONS

What is an API?, Mar. 21, 2020, Red Hat, Inc., printed through www.archive.org (date is in the URL in YYYYMMDD format) (Year: 2020).*

Calculate your rewards card's value: 8-point checklist, retrieved on Jan. 17, 2020 from https://www.creditcards.com/credit-card-news/calculat-rewards-card-value-checklist.php.

The 4 Best Apps to Track Credit Card Rewards, retrieved on Jan. 24, 2020 from https://www.forbes.com/advisor/credit-cards/best-apps-to-track-credit-cards-rewards/.

* cited by examiner

SYSTEM, METHOD AND COMPUTER-ACCESSIBLE MEDIUM FOR PROVIDING FINANCIAL ACCOUNT RECOMMENDATION BASED ON USE OF BENEFITS

FIELD OF THE DISCLOSURE

The present disclosure relates generally to the analysis of user spend on financial accounts, and more specifically, to exemplary embodiments of an exemplary system, method and computer-accessible medium for analyzing and recommending financial accounts based on user spend.

BACKGROUND INFORMATION

There are numerous credit cards from which users can choose from. Many credit cards do not provide any ancillary benefits; they only provide the account holder (i.e. the user) the ability to charge items on the credit card and pay the monthly bill for the entire amount charged at a later date. However, some credit cards provide ancillary benefits. These can include cash back, reward points, airline miles, hotel points etc. (cash back, airline miles, etc. will be collectively referred to herein as reward points). Credit cards may also include other non-traditional ancillary benefits. These can include extended warranties, travel insurance, travel credits, hotel or airline status, etc. Additionally, each credit card can have certain categories that earn more rewards points than other categories. For example, on certain credit cards, regular spend might accrue 1 point/dollar, while travel spend may earn 3 points/dollar. Often times these credit cards also have an annual fee associated with the credit card. The fee can be small (e.g., as little as less than $100/year) or high (e.g., over $500/year). Generally, credit cards that provide more benefits have a higher annual fee.

Given all of the ways that a user can earn benefits from a credit card, it can be difficult to determine the actual value received by the user. Thus, it can be difficult for a user to determine if they gained enough value from a credit card, as compared to the annual fee for the credit card, to determine whether or not it is worth keeping the credit card. Additionally, there is an opportunity cost associated with using one credit card over another credit card. For example, if a user spends a lot of money on travel, they may be better off using a credit card that provides more rewards for travel purchases (e.g., 3 points/dollar). However, they may just be using a credit card that only provides 1 point/dollar for all purchases. The user, however, might not know about the other credit card, or how the other credit card can benefit them.

Thus, it may be beneficial to provide an exemplary system, method and computer-accessible medium for analyzing and recommending financial accounts based on user spend, which can overcome at least some of the deficiencies described herein above.

SUMMARY OF EXEMPLARY EMBODIMENTS

An exemplary system, method, and computer-accessible medium for providing a financial account recommendation to person(s) can include receiving a transaction history for the person(s) associated with a first financial account, determining first rewards information based on the transaction history, accessing database(s) containing rewards rates for a plurality of second financial accounts, determining second rewards information for a particular second financial account of the plurality of second financial accounts based on the transaction history, and providing the financial account recommendation to the person(s) to one of (i) keep the first financial account or (ii) switch to the second financial account based on a comparison of the first rewards information to the second rewards information.

In some exemplary embodiments of the present disclosure, the first financial account and the plurality of second financial accounts can be credit card accounts. The first financial account can be associated with a first financial institution and the second financial account can be associated with a second financial institution, where the first financial institution can be different than the second financial institution. The first rewards information can be determined by determining a number of rewards points associated with each transaction in the transaction history, where the number of rewards points can be based on a category at the first financial institution that can be associated with each transaction. The second rewards information can be determined by determining a number of further rewards points associated with each transaction history, where the number of further rewards points can be based on a further category at the second institution that can be associated with each transaction. A first financial cost associated with the first financial account and a second financial cost associated with the second financial account can be determined, and the financial account recommendation can be provided based on the first financial cost and the second financial cost.

In certain exemplary embodiments of the present disclosure, financial statement(s) can be received from the person(s), and the transaction history can be generated by performing an optical character recognition procedure on the financial statement(s). Alternatively, or in addition, an Application Program Interface (API) call(s) can be initiated with a financial institution associated with the first financial account, and the transaction history can be downloaded using the API call(s). Benefit(s) associated with the first financial account(s) can be determined, whether the benefit(s) was used by the person(s) can be determined, and the first rewards information can be determined based on the determination of whether the benefit(s) was used.

In some exemplary embodiments of the present disclosure, an Application Program Interface (API) call(s) can be initiated with (i) travel account(s) associated with the person(s) or (ii) email account(s) associated with the person(s), and whether the benefit(s) was used by the person(s) can be determined based on the API call(s). A monetary value associated with the use of the benefit(s) can be determined. The travel account(s) can include (i) an airline rewards account, (ii) a hotel rewards account, (iii) a car rental rewards account, or (iv) a taxi service rewards account. The benefit(s) can include an enrollment in a trusted traveler program(s).

Additionally, an exemplary system, method, and computer-accessible medium for determining rewards information for person(s), can include receiving information related to financial accounts(s) associated with the person(s), determining benefit(s) associated with the financial accounts(s), initiating Application Program Interface (API) call(s) with (i) a travel account(s) associated with the person(s) or (ii) an email account(s) associated with the person(s), determining if the benefit(s) was used by the person(s) based on the API call(s), and determining the rewards information based on the determination of whether the benefit(s) was used. A monetary value associated with the use of the benefit(s) can be determined, and the rewards information can be determined based on the monetary value. A request can be sent to the person(s) for an updated monetary value based on an actual value received by the person(s) for the benefit(s), and the monetary value can be updated based on the updated monetary value. The travel account(s) can include (i) an airline rewards account, (ii) a hotel rewards account, (iii) a car rental rewards account, or (iv) a taxi service rewards account.

In some exemplary embodiments of the present disclosure, the benefit(s) can include an enrollment in trusted traveler program(s). A transaction history for the person(s) associated with the financial accounts(s) can be received, first further rewards information can be determined based on the transaction history, a database(s) containing rewards information for a plurality of further financial accounts can be accessed, second further rewards information for a particular further financial account of the plurality of further financial accounts can be determined based on the transaction history, and a financial account recommendation can be provided to the person(s) to (i) keep the financial accounts(s) or (ii) switch to the further financial account based on (i) the rewards information and (ii) a comparison of the first further rewards information to the second further rewards information.

Further, an exemplary system, method, and computer-accessible medium for providing a financial account recommendation to a person(s) can include receiving a first transaction history for the person(s) associated with a first financial account, determining first rewards information based on the transaction history, determining a second transaction history by applying a machine learning procedure(s) to the first transaction history, where the second transaction history includes transactions likely to be made by the person(s) in a future time period, determining second rewards information based on the second transaction history, and providing a financial account recommendation to the person(s) to one of (i) keep the first financial account or (ii) switch to a second financial account based on the first rewards information and the second rewards information.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

The exemplary system, method and computer-accessible medium, according to an exemplary embodiment of the present disclosure, can be utilized to analyze any account that provides rewards and/or benefits to a person/user in order to provide a recommendation to keep the account, cancel the account, and/or switch to an alternative account. The description below is provided in reference to a credit card account that earns rewards and has particular benefits associated with it. However, one having ordinary skill in the art will understand that any of the description and procedures described herein below can be applied to any account that provides rewards and/or benefits. Additionally, different credit cards provide different rewards currencies (e.g., points, miles, etc.). The exemplary system, method and computer-accessible medium, according to an exemplary embodiment of the present disclosure, can be applied regardless of the type of rewards currency. However, the description below will be provided in reference to reward points.

Figure 1:
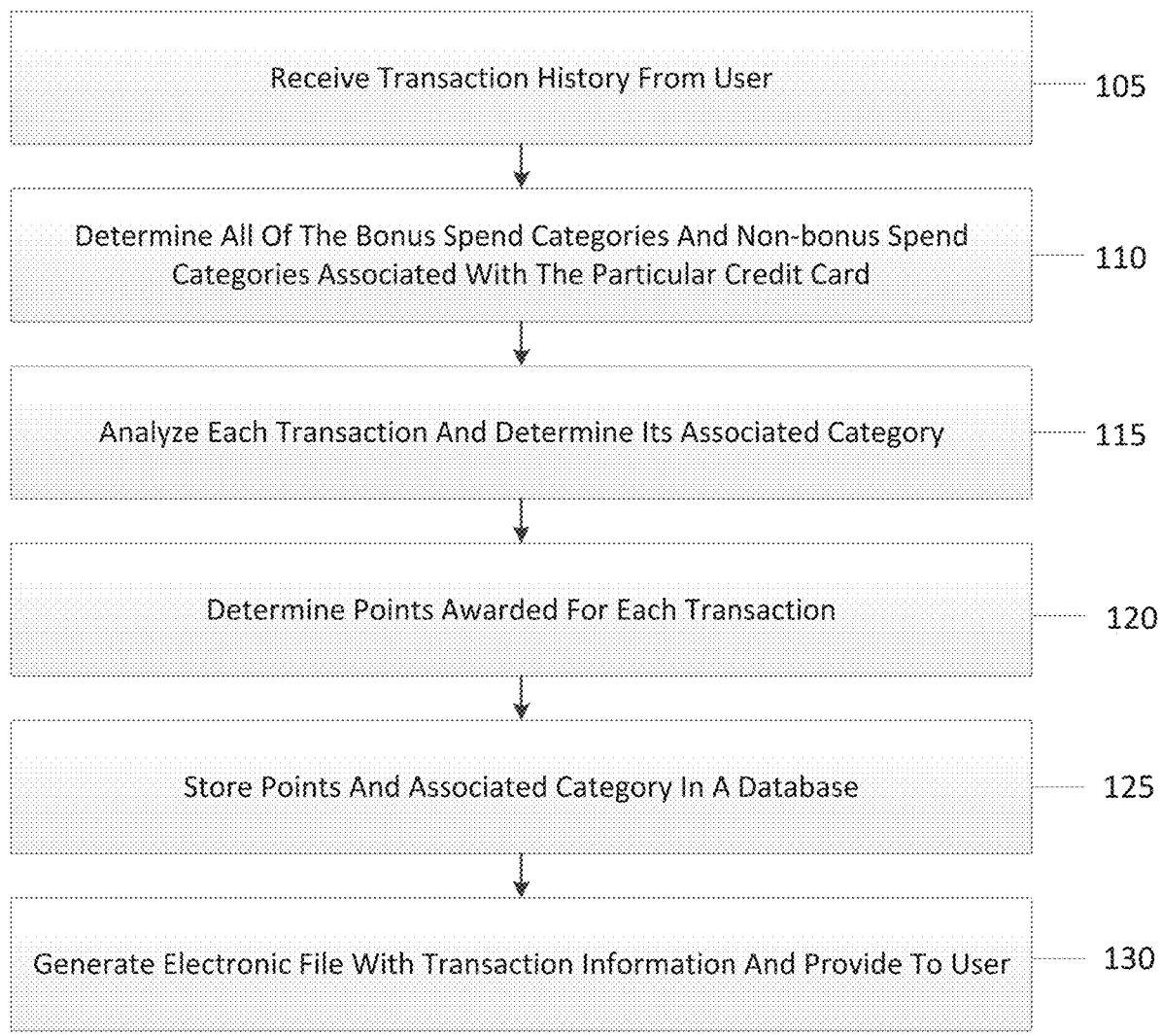
FIG. 1 is an exemplary flow diagram of a method for generating transaction information according to an exemplary embodiment of the present disclosure.

As illustrated in method 100 shown in FIG. 1, the exemplary system, method and computer-accessible medium, according to an exemplary embodiment of the present disclosure, at procedure 105, can receive a transaction history from a user for a particular time period. The time period can be selected by the user, and can correspond to a calendar year or a credit card year. A credit card year can be based on when the user opened the credit card, and generally does not coincide with the calendar year. A reward point value can be assigned to each transaction, which can be based on the unique characteristics of the credit card benefits. For example, at procedure 110, the exemplary system, method and computer-accessible medium can determine all of the bonus spend categories and non-bonus spend categories associated with the particular credit card (e.g., a list of all of the categories and the associated reward points awarded for the category). Once a list of the categories is determined, at procedure 115, the exemplary system, method and computer-accessible medium can analyze each transaction and determine its associated category. Then, at procedure 120, points awarded for each transaction, which is based on the points for that category, can be determined. The points and the associated category can be stored in a database for further review and analysis at procedure 125. Additionally, at procedure 130, an electronic file (e.g., Excel file, Word file, etc.) can be generated and provided to the user, which can include detailed information on each transaction, the category associated with the transaction, and the number of reward points earned for the specific transaction. The electronic file can also include transaction details, which can include the transaction merchant, as well as the specific items/services purchased, if such information is available.

Figure 2:
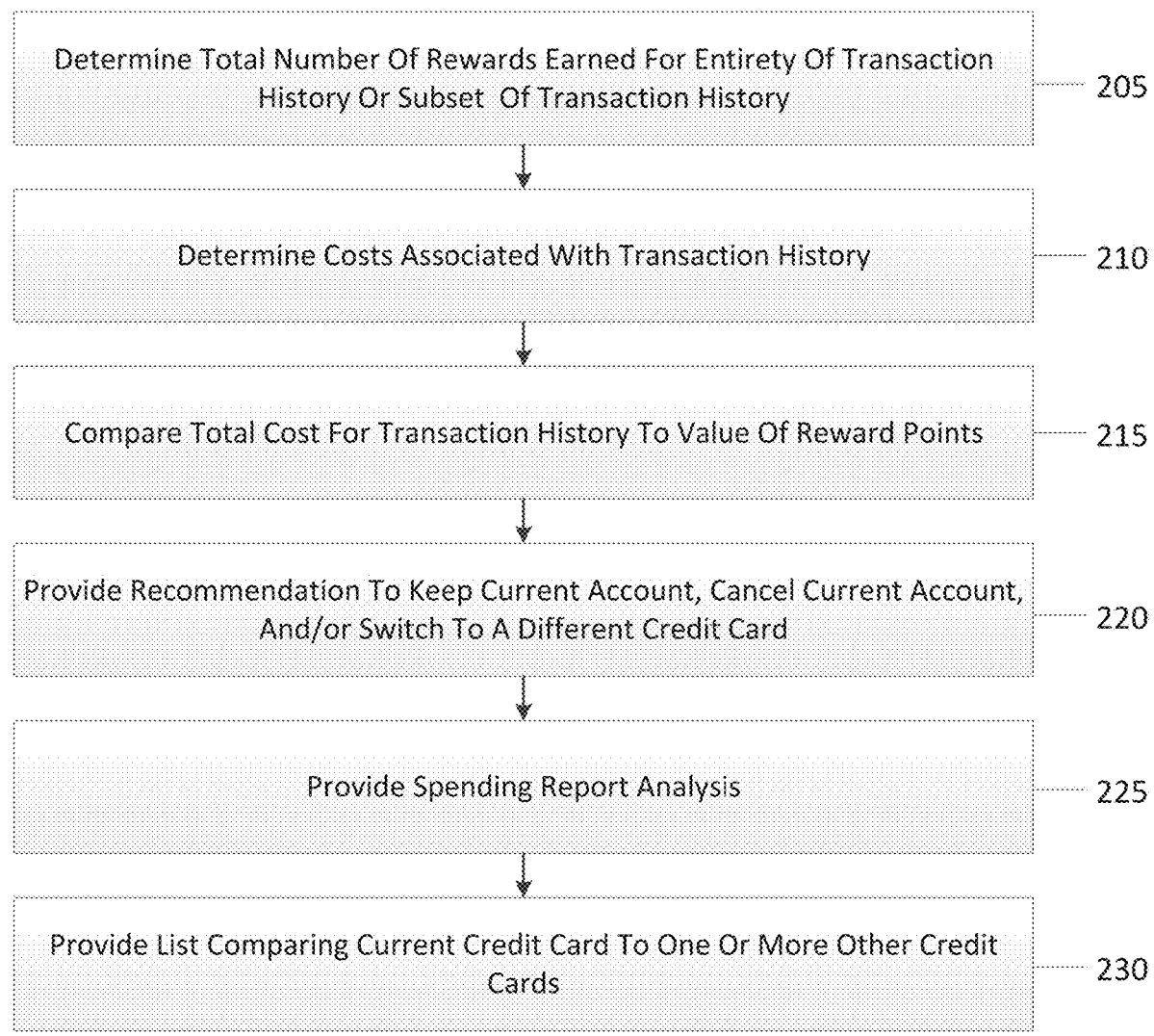
FIG. 2 is an exemplary flow diagram of a method for analyzing transaction information according to an exemplary embodiment of the present disclosure.

Once the relevant information regarding the transactions is stored in a database, various functions can be performed by the exemplary system, method and computer-accessible medium as illustrated in method 200 shown in FIG. 2. For example, the exemplary system, method and computer-accessible medium can determine the total number of rewards earned for the entirety of the transaction history provided, or for a subset of the transaction history at procedure 205. The exemplary system, method and computer-accessible medium can also determine any costs associated with the transaction history at procedure 210. Costs can include, but are not limited to, annual fees associated with the credit card, fees for additional authorized users, late fees, interest charged, and fees for exceeding the credit limit. The total cost for the transaction history can be compared to a value of the reward points (e.g., as discussed below) at procedure 215, to determine whether or not the user has received more value than the total cost incurred. The exemplary system, method and computer-accessible medium, as discussed below, can then provide a recommendation to keep the current account, cancel the current account, and/or switch to a different credit card at procedure 220.

At procedure 225, the exemplary system, method and computer-accessible medium, according to an exemplary embodiment of the present disclosure, can provide a spending report analysis. The spending report analysis can include a detailed list of the transactions and the value received by the user. For example, the spending report analysis can show the user where the most value was achieved (e.g., based on the number of reward points and the value received by the user for the reward points), and what was the least value achieved. Additionally, the exemplary system, method and computer-accessible medium can provide the user an average value per point achieved for the spending period, which can be used by the user to easily compare the spend on the current account, and the potential spend on another account. For example, at procedure 230, the user can be provided with a list comparing the current credit card to one or more other credit cards, and an average value per point for the current account, and what would have been earned on the other credit cards. The user can then easily compare multiple credit cards to determine where they could receive higher value, and how much higher value.

Figure 3:
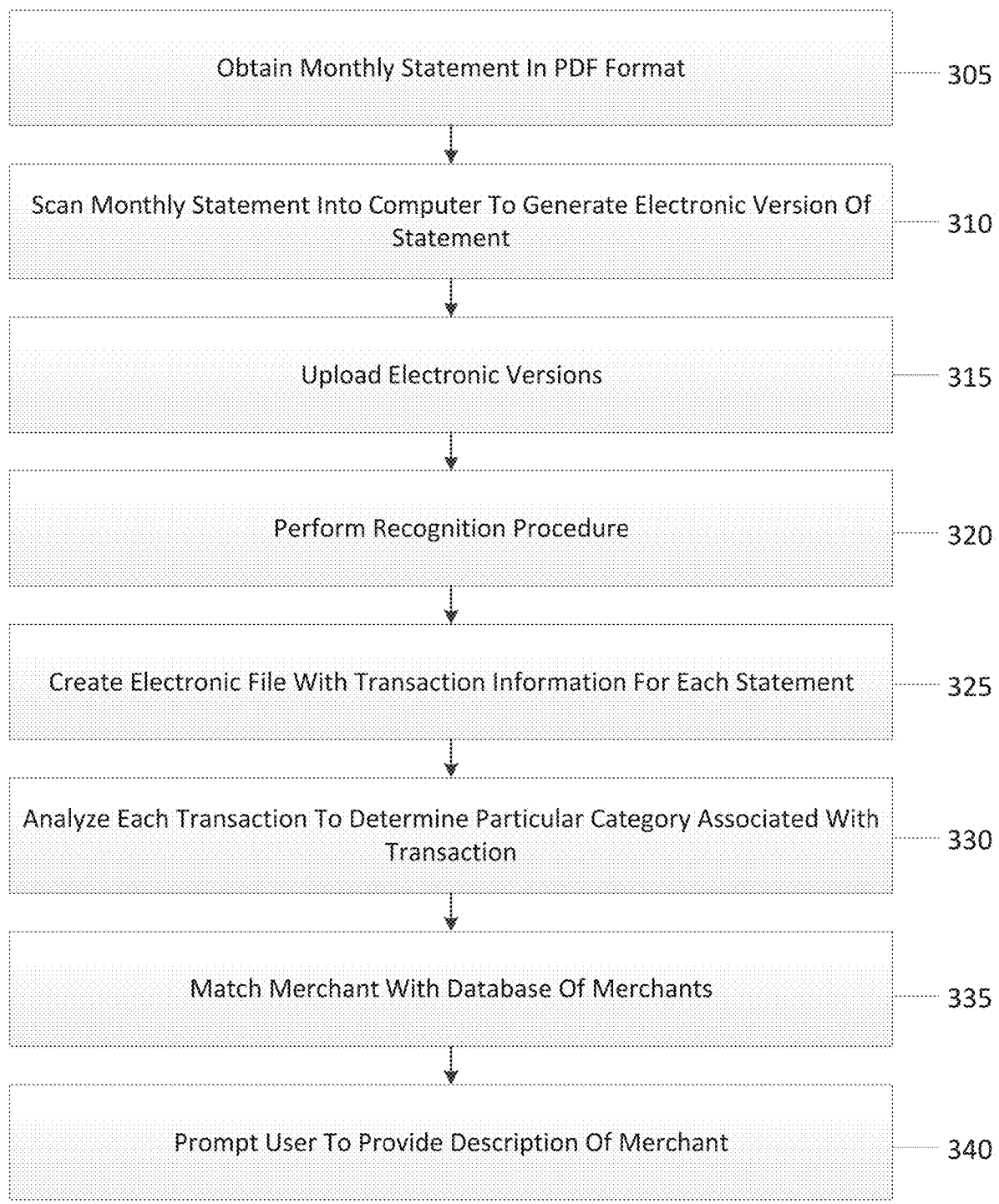
FIG. 3 is an exemplary flow diagram of a method for generating a transaction history according to an exemplary embodiment of the present disclosure.

As illustrated in method 300 shown in FIG. 3, various exemplary procedures can be used to generate a transaction history. For example, at procedure 305, the user can obtain (e.g., downloaded from the credit card issuer's website or received in the mail) each monthly statement (e.g., in portable document format ("PDF")) for the relevant time period. If the monthly statements are in paper form, at procedure 310 they can be scanned into a computer to generate an electronic version of the statement. The user can then upload the electronic versions to the exemplary system, method and computer-accessible medium at procedure 315. If the electronic versions are scanned versions of paper statements, the exemplary system, method and computer-accessible medium can perform a recognition procedure (e.g., an optical character recognition procedure) on the statements in order to determine the relevant information in the statement (e.g., the information regarding each transaction) at procedure 320. An electronic file can be created with the transaction information for each statement at procedure 325, and the transaction information from multiple statements can be appended. The generated transaction history can take the form of any suitable computer readable format, including, but not limited to, CSV, JSON, a markup language (e.g., XML).

As an alternative to downloading each statement in PDF format, the user can electronically download each transaction as a transaction history at procedure 305. This can be in the form of an Excel file, a CSV file, or any other suitable electronic file provided by the credit card issuer where the transactions are electronically stored. The exemplary system, method and computer-accessible medium, according to an exemplary embodiment of the present disclosure, can then obtain the transactions from this file.

As discussed above, the user can obtain the transaction history (e.g., in PDF format, in CSV format) and can load the files into the exemplary system, method and computer-accessible medium. Alternatively, the user can provide their login credentials for the credit card issuer to the exemplary system, method and computer-accessible medium. The exemplary system, method and computer-accessible medium can utilize the login credentials to directly obtain all information regarding the transaction history from the credit card issuer. Additionally, the exemplary system, method and computer-accessible medium can obtain other pertinent information directly from the credit issuer including, but not limited to, the annual fee for the credit card, the merchant categories, and the bonus and non-bonus spend categories, etc. Thus, the user does not need to perform the manual process of obtaining all of the information to input it into the exemplary system, method and computer-accessible medium. Additionally, the exemplary system, method and computer-accessible medium can periodically update the transaction information, without user input, to constantly monitor whether the user is obtaining enough value to recommend keeping the credit card. This can facilitate the exemplary system, method and computer-accessible medium to periodically provide the user with the value achieved (e.g., on a rolling basis), and an alert can be provided to the user if the value achieved drops below the cost for the credit card, or if another credit card becomes more valuable.

Once the transaction history is generated (e.g., based on the above) the exemplary system, method and computer-accessible medium can analyze each transaction to determine the particular category associated with the transaction at procedure 330. This can be based on the merchant name and the merchant type. Each merchant can be matched with a database of merchants at procedure 335. The database of merchants can include a description of the merchant, and the goods or services provided the merchant. If the exemplary system, method and computer-accessible medium is unable to match the merchant in the database, the user can be prompted to provide a description of the merchant. This can be more prevalent for local businesses than for national businesses at procedure 340. The database can then be updated with the information pertaining to this merchant.

Figure 4:
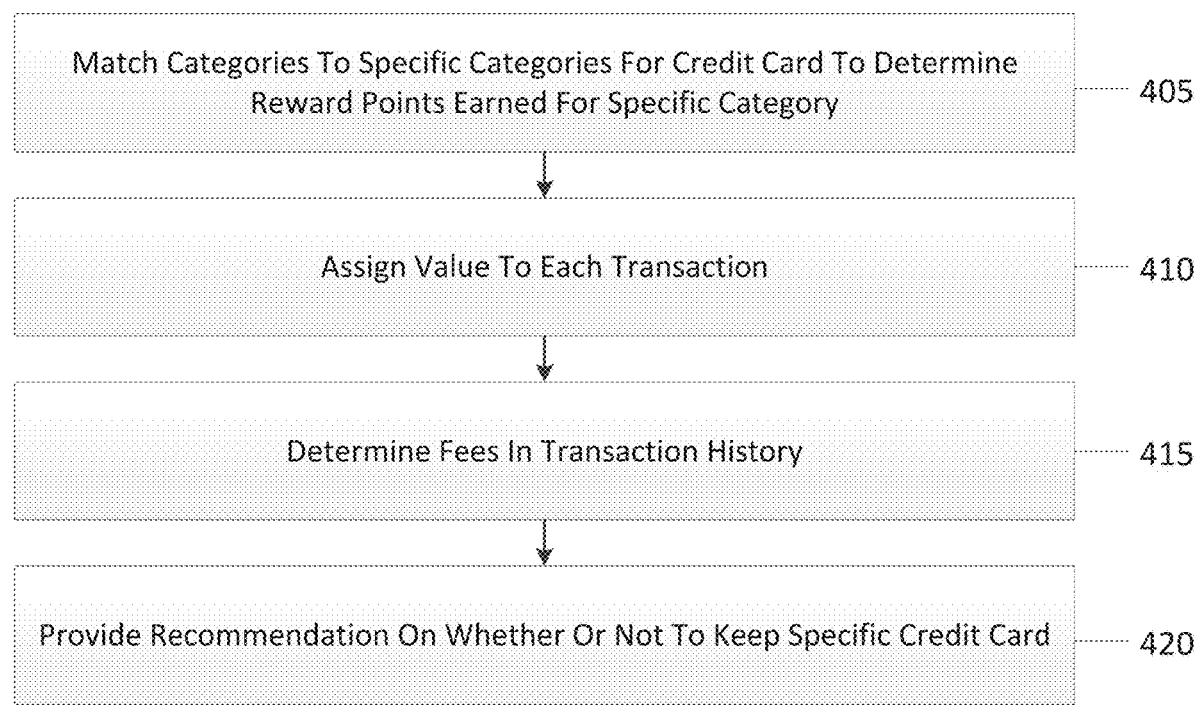
FIG. 4 is an exemplary flow diagram of a method for providing a recommendation to a user according to an exemplary embodiment of the present disclosure.

As illustrated in method 400 shown in FIG. 4, once each merchant is categorized, the categories can be matched to the specific categories for the credit card in order to determine the reward points earned for the specific category at procedure 405. Each transaction can then have a value assigned to it at procedure 410. The exemplary system, method and computer-accessible medium can then determine the fees in the transaction history at procedure 415. This can be based on the nomenclature assigned to each fee for the specific credit card, which can include, but is not limited to, annual fee, late fee, interest fees, etc. Once the total value received and the total costs incurred have been obtained, the exemplary system, method and computer-accessible medium, according to an exemplary embodiment of the present disclosure, can provide a recommendation on whether or not to keep this specific credit card at procedure 420. However, as discussed below, the exemplary system, method and computer-accessible medium can also provide a recommendation to switch to a different credit card, keep this credit card and apply for a new credit card, and/or which credit card the user should use for specific transactions.

The exemplary system, method and computer-accessible medium can determine a monetary value for each benefit provided by the credit card. For example, a fixed amount can be assigned to each reward point. This can be based on a fixed value assigned to each point by the credit card issuer. In particular, many credit card issuers facilitate a user to spend their reward points at a fixed rate (e.g., 1 cent per point, 1.5 cents per point). This fixed rate assigned by the credit card issuer can then be used by the exemplary system, method and computer-accessible medium. However, in certain circumstances, a user can obtain a higher value from a reward point. For example, many reward points can be transferred to an airline mile or a hotel point, and be used to book travel services with the airline or hotel. The user can obtain a higher value based on the travel service booked. For example, if a user can book a round trip business class ticket for 100,000 points (e.g., by transferring to miles at an airline) for a ticket that would normally cost $4,000, then the user would obtain a value of 4 cents per point. This is significantly higher than the normal fixed rate provided by the credit card issuer, which may only be 1 cent per point or 1.5 cents per point.

While assigning a fixed value per point can be beneficial, it may not be an accurate reflection of the amount of value actually achieved by the user. In order to determine the actual value achieved, the exemplary system, method and computer-accessible medium can analyze travel by the user to determine any hotels they have stayed in and any flights they have taken. For example, as discussed below, the exemplary system, method and computer-accessible medium, according to an exemplary embodiment of the present disclosure, can interface with the user's travel rewards account (e.g., airline accounts, hotel accounts, taxi service accounts, etc.) to determine the travel booked and taken by the user. The exemplary system, method and computer-accessible medium can determine the actual value of the travel at the time of booking in order to assign a per point value for the reward points. For example, the exemplary system, method and computer-accessible medium can access historical travel data, and analyze the historical travel data for the actual day and time that the travel was booked. This can be the value assigned to the reward points used by the user.

The exemplary system, method and computer-accessible medium can also assign a fixed value per point depending on where the reward point was transferred to. For example, if the user transfers a certain amount of reward points (e.g., 50,000) to an airline partner, the exemplary system, method and computer-accessible medium may assign one value to each of these points (e.g., 1.75 cents per point). If the user also transfers a certain amount of reward points (e.g., 50,000) to a hotel partner, then the exemplary system, method and computer-accessible medium may assign a second value to these points (e.g., 1.25 cents per point). The assigned value can depend on the type of transfer partner (e.g., hotel, airline, taxi service, etc.). The assigned value can also depend on which partner is transferred to (e.g., Hilton vs. Hyatt or Delta Airlines vs. United Airlines).

The exemplary system, method and computer-accessible medium can also send a request to the user to update the value assigned to the reward points. For example, the exemplary system, method and computer-accessible medium may assign a value of 4 cents per point if the user books a business class ticket that sells for $4,000 for 100,000 reward points. However, the user may not have been willing to pay $4,000 for the airline ticket. Thus, 4 cents per point may not be an accurate reflection of the value to the particular user. Thus, the exemplary system, method and computer-accessible medium can send a request to the user to update the point value. This can be a global request that updates the point value for all points earned by the user. Alternatively, the exemplary system, method and computer-accessible medium can send requests for individual travel taken by the user to update the value for the particular reward points used for the particular travel taken.

The exemplary system, method and computer-accessible medium update the value earned by the user by querying the user regarding their benefit use. For example, for each benefit provided by a credit card, the user can be queried to determine if they used the benefit, and how many times the benefit was used. Benefits can include, travel reimbursement provided by the credit card, trusted traveler program reimbursement, insurance benefits, airport lounge benefits, early airplane boarding benefits, early check-in/checkout benefits from a hotel, free hotel night credits. A default value can be assigned to each of the benefits used, which can be updated by the user based on the relative value assigned by the user.

For example, if the user shares their hotel loyalty account, the exemplary system, method and computer-accessible medium can determine the number of free nights, and the number of stays for a user. Benefits related to these stays can then be determined (e.g., late check-in, late checkout, free amenities, etc.). A range of values can be provided to the user, and the user can select the value they believe they received from these benefits. They can also provide information regarding whether or not they actually took advantage of a particular benefit for a particular stay, as well as identify certain stays as business or personal, and which benefits they generally take advantage of for the particular type of stay. Information regarding the type of stay can be automatically determined by the exemplary system, method and computer-accessible medium. For example, stays that occur during the week, without a weekend component, are more likely to be business travel than personal travel. These types of stays can be marked as such, and benefits the user uses during work stays can be calculated for these days. In contrast, stays that include a weekend component can be more likely to be personal stays, and benefits associated with personal stays can be assigned as such. This can also be the case for airline travel, as airline travel that occurs only during the week is more likely to be business travel.

Additionally, the itinerary for the user can be accessed to determine any benefits that can be used based on the airport the user flies out of. For example, certain airports have lounges that can be accessed by the user during travel. The exemplary system, method and computer-accessible medium can determine which lounges a user has access to, and whether or not there is a lounge located at the airport the user is flying out of. The exemplary system, method and computer-accessible medium can also access information for a particular flight (e.g., terminal information and gate information). For example, while there may be a lounge at the particular airport that the user is flying out of, the lounge may not be accessible based on the location of the lounge as compared to the location of the user's gate. Thus, a determination of whether or not a user used their lounge access can be based on the airport of travel (e.g., whether the airport actually has a lounge) and/or the location of the lounge within the airport (e.g., whether or not user can actually access the lounge based on location as compared to the user's gate location).

For airplane boarding benefits, the exemplary system, method and computer-accessible medium can determine the number of flights booked by the user, and the number of flights taken on particular airlines (e.g., Southwest) where early boarding may be more useful than on other airlines based on how boarding for that airline operates. Additionally, for insurance benefits (e.g., car insurance benefits) the default value can be based on the number of times the user rented a car (e.g., based on the number of times and the number of days). This can be obtained by accessing the user's car rental account or through any charges on the user's credit card account.

Additionally, for any upgrades obtained by the user, the exemplary system, method and computer-accessible medium can calculate the value paid by the user for the non-upgrade (e.g., the value for an economy class seat) and the value associated with purchasing the upgrade (e.g., the value of a business class seat). The difference in value can be the value of the benefit obtained by the user. The value of the upgrade can be based on the value of the upgrade at the time the upgrade actually occurred, or historical data can be obtained to determine the value of the upgrade when the user paid for the non-upgrade. For example, if a user books on February 1 for travel on September 1, and the user is upgraded on the day of travel (e.g., September 1) the cost of a business class seat will generally be lower on February 1 than on September 1. Thus, by comparing the cost of booking an economy ticket on February 1 to the cost of booking a business class ticket on September 1 may not provide an accurate indication of value to the consumer. Thus, the historical data can be beneficial to determine the cost of the business class seat when the economy seat was booked. Additionally, the comparison of the difference in cost may not provide an accurate indication of value to the user, as the user may never have purchased a business class seat. Thus, the value of the upgrade may be less than the difference in cost. The exemplary system, method and computer-accessible medium can request information from the user on the actual value obtained by the upgrade.

In addition to analyzing and comparing the benefits and fees associated with different credit cards, the exemplary system, method and computer-accessible medium can also analyze the terms associated with the credit card. For example, each credit card has an agreement provided to the user, from the credit card issuer that the user must agree to. The user is generally not allowed to negotiate these terms, and users rarely, if ever, actually read the terms. Additionally, these terms can be difficult to understand for the lay person. These terms, however, can vary greatly between credit card issuer. The exemplary system, method and computer-accessible medium can automatically analyze the terms (e.g., the agreements) from multiple credit cards in order to compare them. The exemplary system, method and computer-accessible medium can perform a term-by-term analysis to determine if the terms of one credit card are better than the terms of another credit card. This can be performed, for example, using a machine learning procedure that can be used to analyze the agreements.

For example, an exemplary machine learning procedure can be trained (e.g., supervised or unsupervised) on a database containing multiple credit card agreements. The credit card agreements can be annotated, providing definitions for various terms, and whether terms are positive or negative for a user. The results of the machine learning procedure can be checked and revised (e.g., by a legal professional with knowledge of the relevant terms). The exemplary machine learning procedure can then analyze the credit card agreements of specific credit cards to determine if the terms of the one of the credit cards is better than the other. A value can be assigned to each of the terms to compare the terms from one agreement to another. Additionally, a value difference between different credit cards can be determined, which can be positive or negative. For example, switching from one credit card to another might provide additional reward benefits value (e.g., which would be a positive number), but has worse terms (e.g., a negative value number). Thus, when making a recommendation to the user, the exemplary system, method and computer-accessible medium can take into account both the added benefits, but any potential downside (e.g., credit card terms).

The exemplary system, method and computer-accessible medium, according to an exemplary embodiment of the present disclosure, can generate a database that includes relevant information for multiple credit cards. The database can include credit cards issued by multiple, unrelated, banks. For example, the database can include credit cards issued by Citibank, Chase, Bank of America, American Express, etc. The exemplary system, method and computer-accessible medium can scrape the relevant information for each credit card directly from the credit card issuer's website. The relevant information can also be obtained from physical credit card agreements that include the relevant information for the credit card. The relevant information can include, but is not limited to, reward points earning rates, reward categories, travel benefits, insurance benefits, trusted traveler program benefits, credit card agreements, annual fees, interest rates, fees, etc. This information can be used by the exemplary system, method and computer-accessible medium to evaluate whether to keep a credit card account or switch to another credit card account.

For example, the exemplary system, method and computer-accessible medium can generate a recommendation on whether or not to keep a credit card based solely on the information regarding that credit card. In particular, an analysis can be performed on the value received by the user for the particular time period and compare it to the cost of having the credit card. The user can then be provided with a recommendation on whether or not to keep the credit card, as well as how much extra value the user is receiving as compared to the cost of the credit card, assuming the user is receiving more value than the cost. However, the exemplary system, method and computer-accessible medium can also compare the value earned by the user for the credit card the user already has and compare it to the potential value of a different credit card. For example, the exemplary system, method and computer-accessible medium can determine a potential value earned for one or more credit cards in the database based on the received/generated transaction history. A subset of the credit cards can be determined based on which credit cards would provide greater value than the current credit card. As discussed herein, the value can be based on the amount spent by the user, as well as any other ancillary benefits provided by the credit card, which have been discussed in more detail herein.

The user can be provided with a list of all credit cards in which the user would obtain greater value, as well as all of the relevant terms for the credit card. The user can then determine whether or not to switch to one of the recommended credit cards. The exemplary system, method and computer-accessible medium can facilitate the user to select a particular credit card and initiate an application for the new credit card without the user having to navigate to the credit card issuer's website. As an alternative to providing the user with a list of all credit cards, the exemplary system, method and computer-accessible medium can further analyze the subset of credit cards and provide a recommendation for a single credit card account. This can be based on which credit card provides the highest value based on the user's previous spend. Additionally, the exemplary system, method and computer-accessible medium can include potential future spend, as discussed herein, in order to determine where the user will obtain the most future value from the credit card. The exemplary system, method and computer-accessible medium may also recommend that the user sign up for more than one credit card, and provide a recommendation as to what type of spending to put on which credit card (e.g., put travel spending on one credit card and all other spending on another credit card).

The exemplary system, method and computer-accessible medium can interface with an email program and/or a travel program in order to determine the travel taken by the user. For example, when a user books travel, generally they will receive an email receipt for the travel. The exemplary system, method and computer-accessible medium can access the user's email address account in order to determine any travel booked by the user by scanning the email messages and locating any travel receipts. A determination can be made as to whether the user paid for the travel using the user's money (e.g., by charging it on a credit card) or if reward points issued by the credit card were directly used to book the travel. If reward points issued by the credit card were used to book the travel, then the exemplary system, method and computer-accessible medium can determine the value achieved by the user for the reward travel in order to determine the overall value achieved by the user for owning the credit card. Additionally, a determination can be made as to whether the user transferred the credit card reward points to a third party (e.g., credit card hotel partner or credit card airline partner), and the value achieved in travel booked based on the transfer.

The exemplary system, method and computer-accessible medium, according to an exemplary embodiment of the present disclosure, can also interface with an email program and/or travel program to determine if the user took advantage of travel statuses provided by the credit card. For example, many credit cards provide certain status levels with travel reward programs. These status levels can provide the user with certain services (e.g., free water, free breakfast, etc.) as well as travel upgrades (e.g., hotel room upgrades or seat upgrades). These benefits cannot easily be determined by simply reviewing the user's transaction history. However, generally these upgrades and services are shown in the user's travel rewards account. Thus, the exemplary system, method and computer-accessible medium can access the travel rewards account (e.g., the hotel chain's website or the airlines website) to determine what travel the user took, and if the user was provided with any upgrades or services for that travel that were the result of the status provided by the credit card. The exemplary system, method and computer-accessible medium can provide a value for all of these benefits, and then use this information when determining the recommendation of whether to keep the credit card or switch to another credit card.

Additionally, the exemplary system, method and computer-accessible medium can perform an API call and access a flight booking tool to determine certain information regarding a particular flight. The flight booking tool can be accessed before or after the flight to obtain relevant information. Relevant information can include, the number of available upgrades (e.g., to first class, business class, economy plus, etc.) for the particular flight. The exemplary system, method and computer-accessible medium can then determine the status that the person has with the airline to make a likelihood determination of whether the person was likely to be upgraded. The exemplary system, method and computer-accessible medium can then send the user an information requesting (e.g., by phone, text, email, push notification, etc.) a confirmation of whether or not the user was actually upgraded.

Many credit cards also come with insurance and extended warranties. The insurance can cover travel booked with the credit card, and the extended warranties can extend a manufacturer's warranty for an item purchased using the credit card. However, this information may not be gleaned from the transaction history associated with the credit card. In order to determine if insurance was used, or if an extended warranty was used, the exemplary system, method and computer-accessible medium can access the user's email account to scan for any emails that indicate that the user took advantage of this benefit, which is usually in the form of a payment to the user. This payment to the user can be used when determining the value achieved for the credit card. Additionally, the payment received, and the credit card benefit that resulted in the payment, can be compared to other credit cards in order to determine if the user would have received the payment from a different credit card. This can be factored into the recommendation of whether or not to keep a credit card.

Even if the user does not take advantage of the insurance provided by a credit card, the value associated with the card can be based on insurance premiums paid by the credit card company. For example, generally, a credit card company will contract with a third-party insurance company to provide any insurance benefits to the user. In order to provide these benefits, the credit card company will pay insurance premiums to one or more insurance companies based on the different type of insurance provided (e.g., travel insurance or extended warranty). Thus, the value of the credit card can be based on the amount of the premiums paid by the credit card company, even if the user does not take advantage of this added benefit. However, this value may not be included if the user does not take advantage of these benefits, and the user can be prompted on whether or not to include this value when the exemplary system, method and computer-accessible medium determines the value realized by the user for the particular credit card.

The exemplary system, method and computer-accessible medium can scan the user's email account looking for various indications that the user took advantage of the benefit. This can include, but is not limited to, looking for upgrade confirmation, looking for surveys after the use of a particular travel, looking for insurance claims, etc.

The exemplary system, method and computer-accessible medium can access the user's email account and rewards account using the user's login credentials for the particular account. For example, an Application Program Interface ("API") can be made to the email account and/or rewards account to access the accounts. An API is an interface or communication protocol between different parts of a computer program intended to simplify the implementation and maintenance of software. An API may be for a web-based system, operating system, database system, computer hardware, or software library. An API specification can take many forms, but often includes specifications for routines, data structures, object classes, variables, or remote calls.

Web APIs are the defined interfaces through which interactions happen between an enterprise and applications that use its assets, which also is a Service Level Agreement ("SLA") to specify the functional provider and expose the service path or URL for its API users. An API approach is an architectural approach that revolves around providing a program interface to a set of services to different applications serving different types of users.

When used in the context of web development, an API is typically defined as a set of specifications, such as Hypertext Transfer Protocol ("HTTP") request messages, along with a definition of the structure of response messages, usually in an Extensible Markup Language ("XML") or JavaScript Object Notation ("JSON") format.

The exemplary system, method and computer-accessible medium can be used to determine the potential future spend for the user in order to determine the future value earned using the user's current credit card, or another credit card to be recommended. The total amount spent by the user for a particular previous time period can be used to estimate the user's future spend. For example, an average amount spent per month can be determined, and this amount can be multiplied by the future time period, in months, being analyzed. The type of spend can also be taken into account. For example, the exemplary system, method and computer-accessible medium can categorize the previous spend based on the earned number of reward points, and base the future spend based on the categories and the amount spent per category. Thus, the determined future spend can more accurately reflect what the user is likely to spend money on. Even if the user's current credit card does not have categories that earn higher reward points, the exemplary system, method and computer-accessible medium can still categorize all of the user's spending in order to analyze which credit card would provide a higher value. For example, if the user is currently putting all of their spend on a credit card that only earns 1 reward point per dollar, the exemplary system, method and computer-accessible medium can categorize the previous spend, and compare the potential earned rewards for other credit cards that may have higher travel earning rates to provide a recommendation to the user.

As an alternative to looking at the user's previous spend, or in addition, the exemplary system, method and computer-accessible medium can analyze the spend of other users similar to the current user's to generate a likely amount of future spend. This can be based on other users that have similar characteristics to the user. For example, an exemplary machine learning procedure can analyze multiple transaction histories for multiple users. A model can be generated, which can be applied to the current user. The model can include various exemplary factors including, but not limited to, income level, types of travel, types of purchases, demographic information (e.g., ethnicity, gender, zip code, type of job, number of kids, married/single), etc. Once a model is generated, the relevant characteristics of the current user can be input into the model to generate a likely future spend, including categories associated with the spending. The model can also take into account the current user's previous spend for the particular time period. When the model is applied to a particular user, the model can be updated based on the user's information. Additionally, the model can determine its accuracy for a likely future spend by reviewing the actual spend by the user after the time period has passed. Thus, the model can constantly update itself in order to increase its accuracy.

The exemplary system, method and computer-accessible medium has been described herein above with reference to a credit card account. However, the exemplary system, method and computer-accessible medium can be used to analyze any user account to determine if the user is obtaining enough value from the account to recommend keeping the account. For example, the exemplary system, method and computer-accessible medium can analyze any music, TV, movie, video game, or book subscription service in order to determine the value obtained by the user. The exemplary system, method and computer-accessible medium can access the user's account (e.g., using login credentials provided by the user) to determine how much and how often the user uses the subscription service. For example, the exemplary system, method and computer-accessible medium can determine how many songs, television shows, movies etc. that the user streamed for a particular time period. A cost for each stream can be determined based on the total number of streams and the monthly fee, in order to obtain a per stream cost. The exemplary system, method and computer-accessible medium can provide this information to the user, and the user can then determine whether or not it is worth it to keep the streaming service. Alternatively, or in addition, the exemplary system, method and computer-accessible medium can determine the cost of other comparable streaming services to provide a recommendation to switch to a competing streaming service.

If the subscription service is for free shipping (e.g., as provided by Amazon Prime), the exemplary system, method and computer-accessible medium can review the transaction history, and then determine the total cost for shipping that would have been paid by the user had the user not had free shipping. This information can then be compared to the cost of the free shipping service to determine if the user would have saved money by separately paying for shipping for each transaction. The exemplary system, method and computer-accessible medium can also provide shopping recommendations on how the user could save money by eliminating the free shipping subscription, but still obtaining free shipping. For example, many websites have free shopping over a certain threshold amount. The exemplary system, method and computer-accessible medium can analyze if the user's transactions would have qualified for free shipping based on the amount per transaction, and then recommend whether or not to keep the free shipping subscription.

The exemplary system, method and computer-accessible medium, according to an exemplary embodiment of the present disclosure, can also compare the user to similar users that do not subscribe to the free shipping service in order to recommend whether or not to keep the service. For example, having access to a free shipping subscription may cause the user to spend more money (e.g., through a higher cost per transaction or more transactions), than if they have to pay for shipping. The exemplary system, method and computer-accessible medium can analyze the spend of similar users that do not subscribe to the free shipping service, and compare it to the actual spend of the user to determine if they would have spent less money by not having access to the free shipping service. Then, a recommendation can be provided on whether or not to keep the free shipping service.

The exemplary system, method and computer-accessible medium can also compare the cost of shopping at the store that provided the free shipping service (e.g., Amazon) to the cost of shopping at competing stores. For example, if a user pays for a free shipping service associated with a particular store, they are more likely to shop only at that particular store. However, the user may be able to save a significant amount of money had they shopped around to find the best price. The exemplary system, method and computer-accessible medium can review and analyze historical pricing information for the items purchased, and the time the purchase was made, to determine whether or not the user would have been better off not paying for the free shipping service and shopping at another store.

As discussed above, the exemplary system, method and computer-accessible medium can utilize machine learning to determine likely future spend by the user. The exemplary machine learning can utilize information related to the previous spend of the user, and information related to the spend from multiple users to make the determination, and various exemplary models can be generated (e.g., for different types of users with different types of demographics, spending habits, credit limits etc.). The exemplary system, method and computer-accessible medium can then apply the generated models to determine the user's likely future spend in order to provide a suggestion of whether or not to keep the current credit card or switch to a new credit card. The exemplary model generated can factor in purchases that are more likely to be repurchased and items less likely to be repurchased (e.g., by given them greater weight). For example, the exemplary model can include information such as whether the user has repurchased an item before.

The exemplary system, method and computer-accessible medium can utilize various neural network, such as convolutional neural networks ("CNN") or recurrent neural networks ("RNN") to generate the exemplary models. A CNN can include one or more convolutional layers (e.g., often with a subsampling step) and then followed by one or more fully connected layers as in a standard multilayer neural network. CNNS can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

Figure 5A:
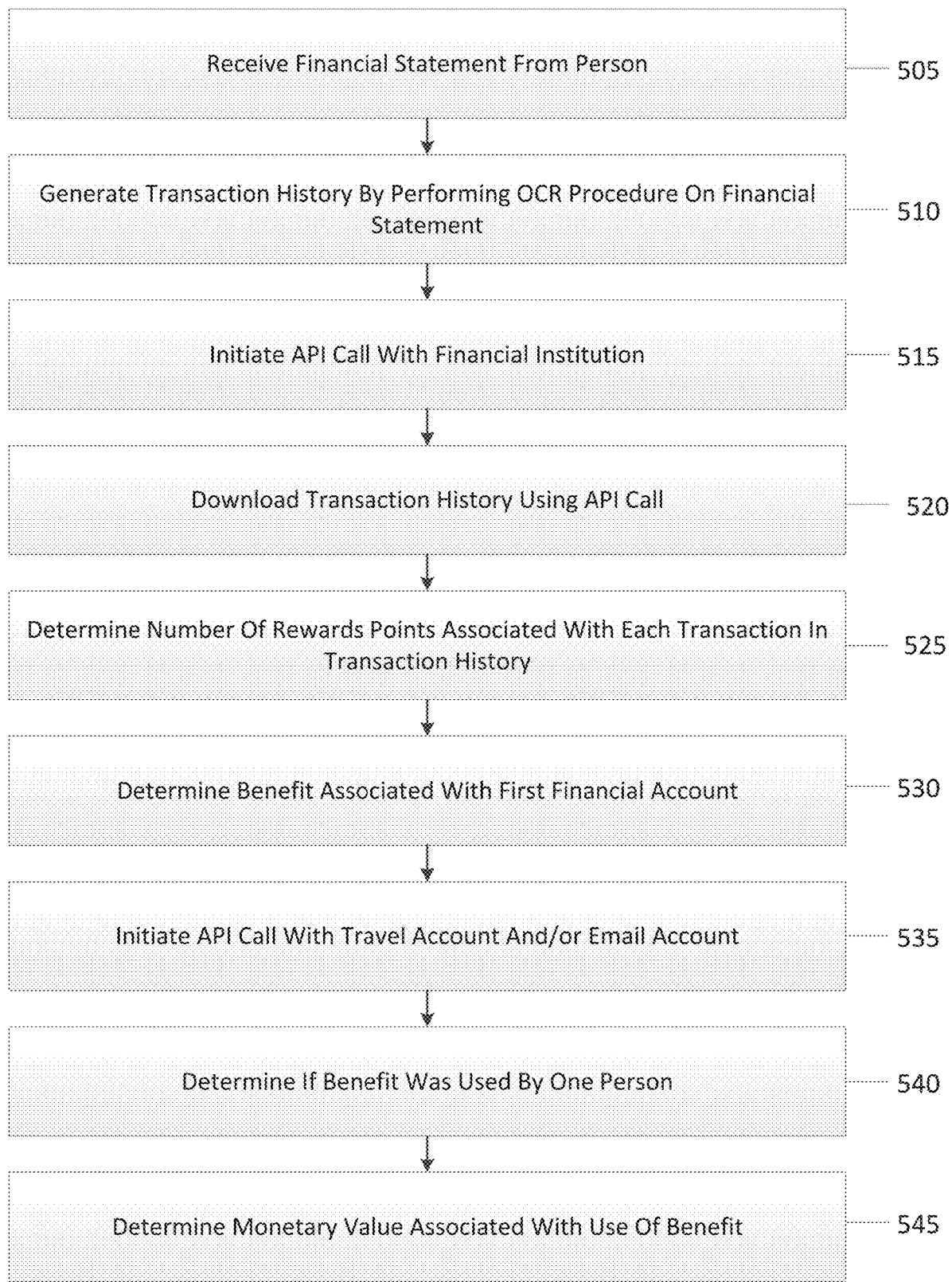
FIGS. 5A and 5B are exemplary flow diagrams of a method for providing a financial account recommendation to a person according to an exemplary embodiment of the present disclosure.
Figure 5B:
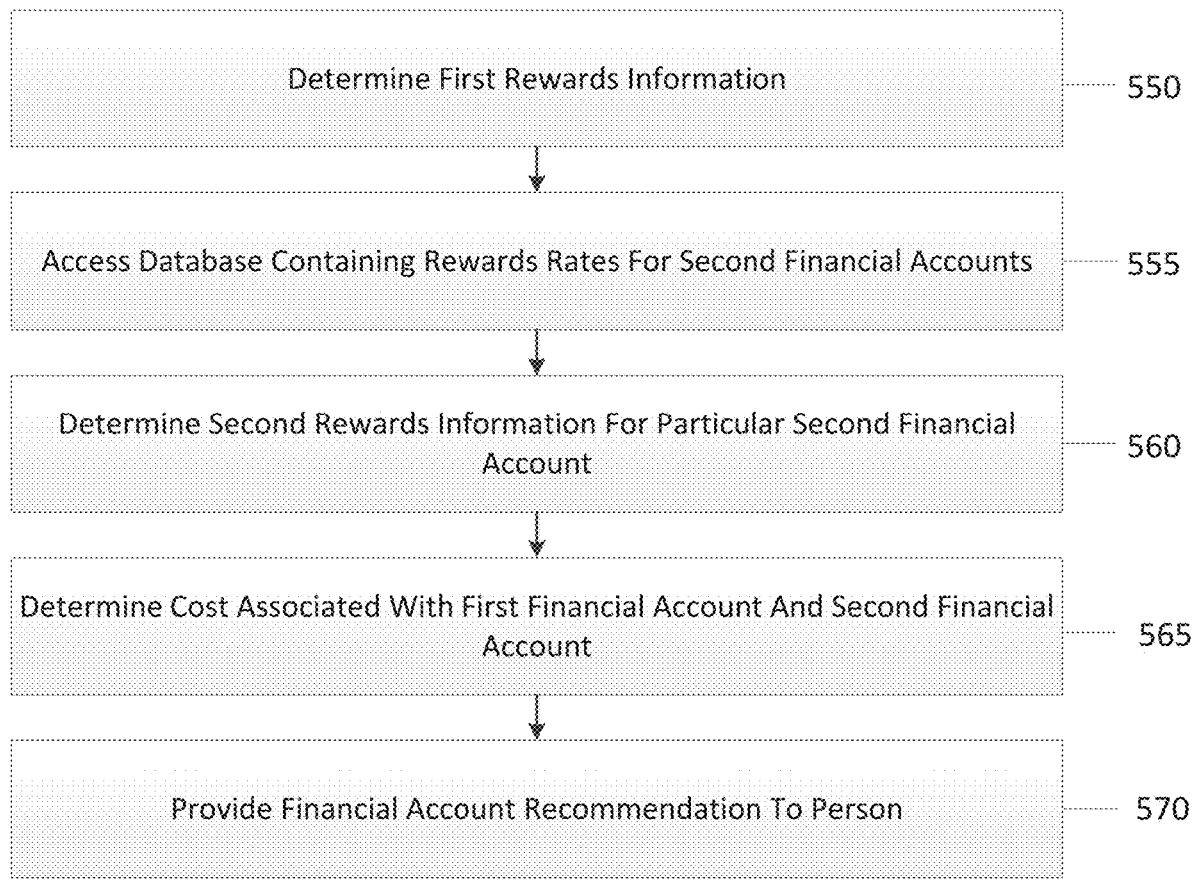

FIGS. 5A and 5B are flow diagrams of a method 500 for providing a financial account recommendation to a person according to an exemplary embodiment of the present disclosure. For example, at procedure 505, a financial statement can be received from the person. At procedure 510, a transaction history can be generated by performing an optical character recognition procedure on the financial statement. Alternatively, or in addition, at procedure 515, an Application Program Interface (API) call can be initiated with a financial institution associated with the first financial account, and at procedure 520, the transaction history can be downloaded using the API call. At procedure 525, a number of rewards points associated with each transaction in the transaction history can be determined. At procedure 530, a benefit associated with the first financial account can be determined. At procedure 535, an API call can be initiated with (i) a travel account associated with the person or (ii) an email account associated with the person. At procedure 540, a determination can be made as to whether the benefit was used by the person. At procedure 545, a monetary value associated with the use of the benefit can be determined. At procedure 550, first rewards information can be determined. At procedure 555, a database containing rewards rates for a plurality of second financial accounts can be accessed. At procedure 560, second rewards information for a particular second financial account of the plurality of second financial accounts can be determined based on the transaction history. At procedure 565, a first financial cost associated with the first financial account and a second financial cost associated with the second financial account can be determined. At procedure 570, a financial account recommendation can be provided to the person.

Figure 6A:
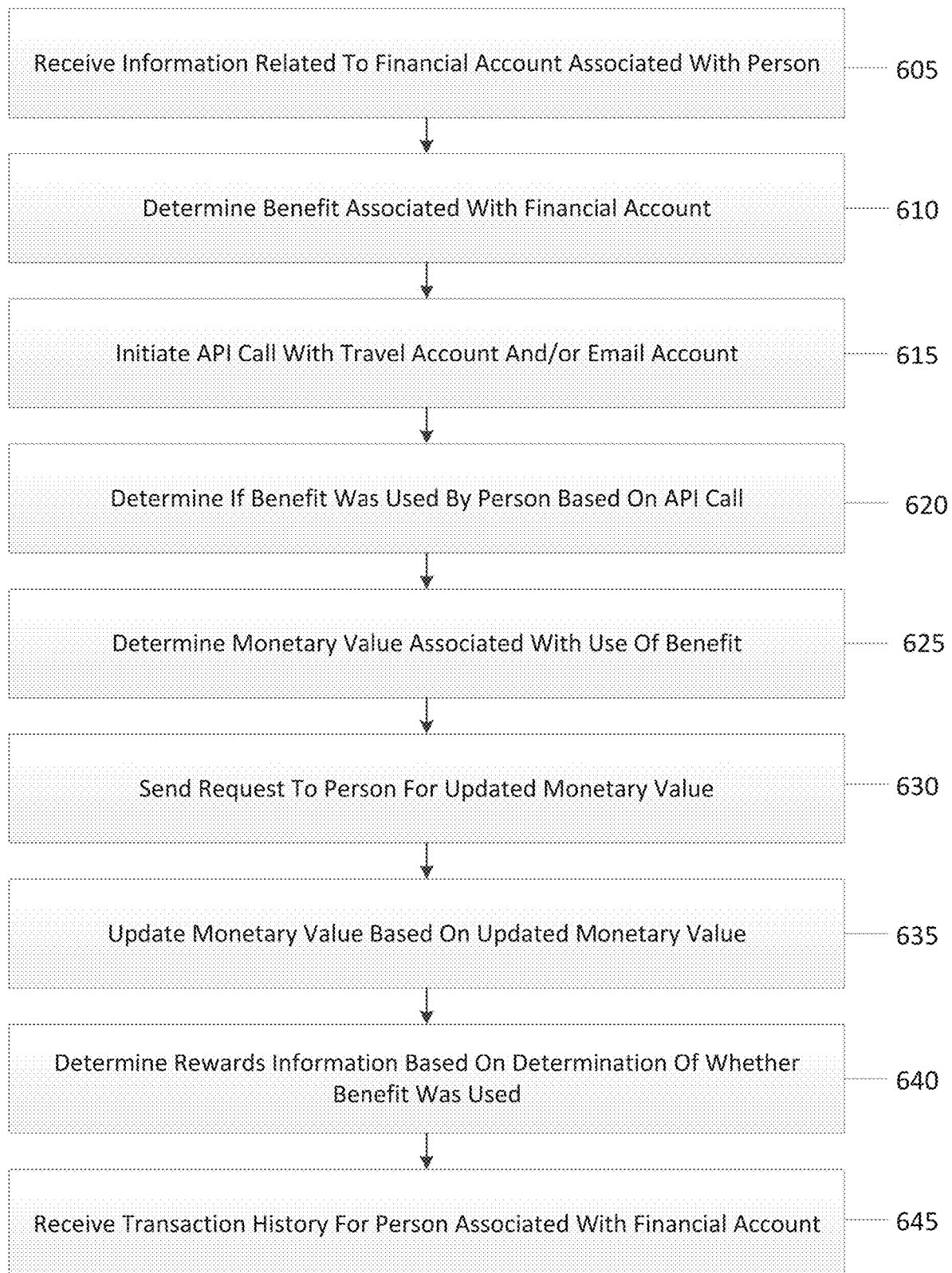
FIGS. 6A and 6B are exemplary flow diagrams of a method for determining rewards information for a person according to an exemplary embodiment of the present disclosure.
Figure 6B:
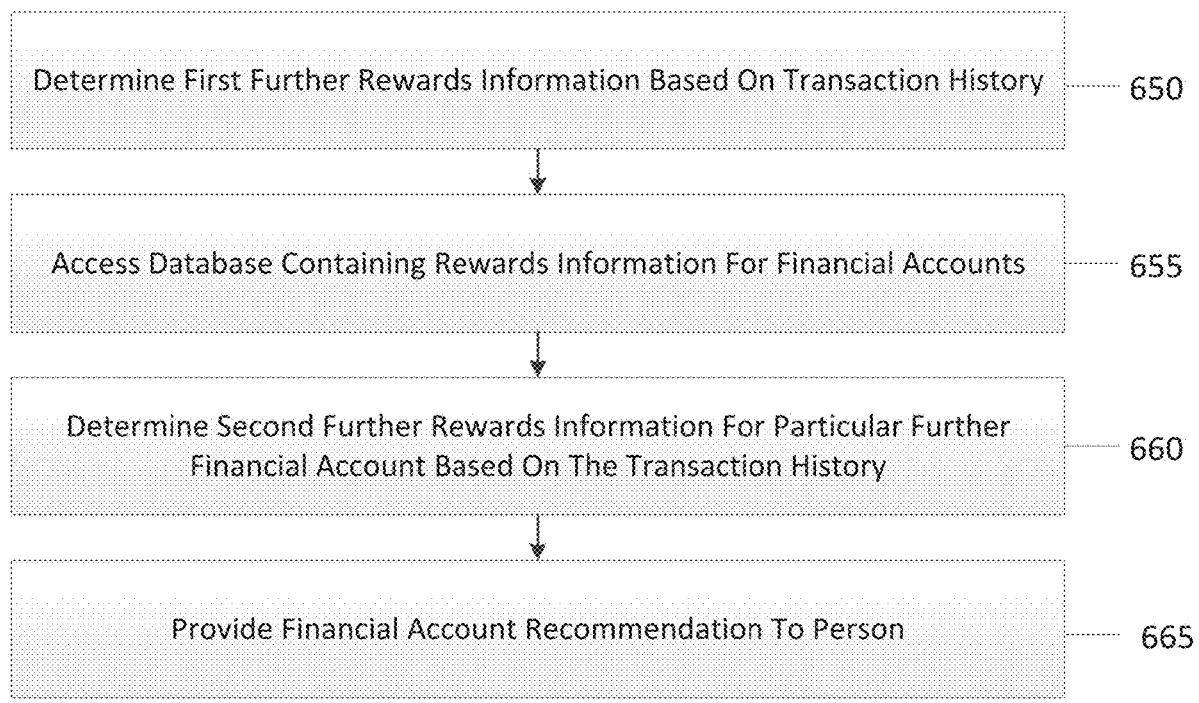

FIGS. 6A and 6B are flow diagrams of a method 600 for determining rewards information for a person according to an exemplary embodiment of the present disclosure. For example, at procedure 605, information related to a financial account associated with the person can be received. At procedure 610, a benefit associated with the financial account can be determined. At procedure 615, an Application Program Interface (API) call can be initiated with (i) a travel account associated with the person or (ii) an email account associated with the person. At procedure 620, a determination can be made as to whether the benefit was used by the person based on the API call. At procedure 625, a monetary value associated with the use of the benefit can be determined. At procedure 630, a request can be sent to the person for an updated monetary value based on an actual value received by the person for the benefit. At procedure 635, the monetary value can be updated based on the updated monetary value. At procedure 640, the rewards information can be determined based on the determination of whether the benefit was used. At procedure 645, a transaction history for the person associated with the financial account can be received. At procedure 650, first further rewards information can be determined based on the transaction history. At procedure 655, a database containing rewards information for a plurality of further financial accounts can be accessed. At procedure 660, second further rewards information for a particular further financial account of the plurality of further financial accounts can be determined based on the transaction history. At procedure 665, a financial account recommendation can be provided to the person to one of (i) keep the financial account or (ii) switch to the further financial account based on (i) the rewards information and (ii) a comparison of the first further rewards information to the second further rewards information.

Figure 7:
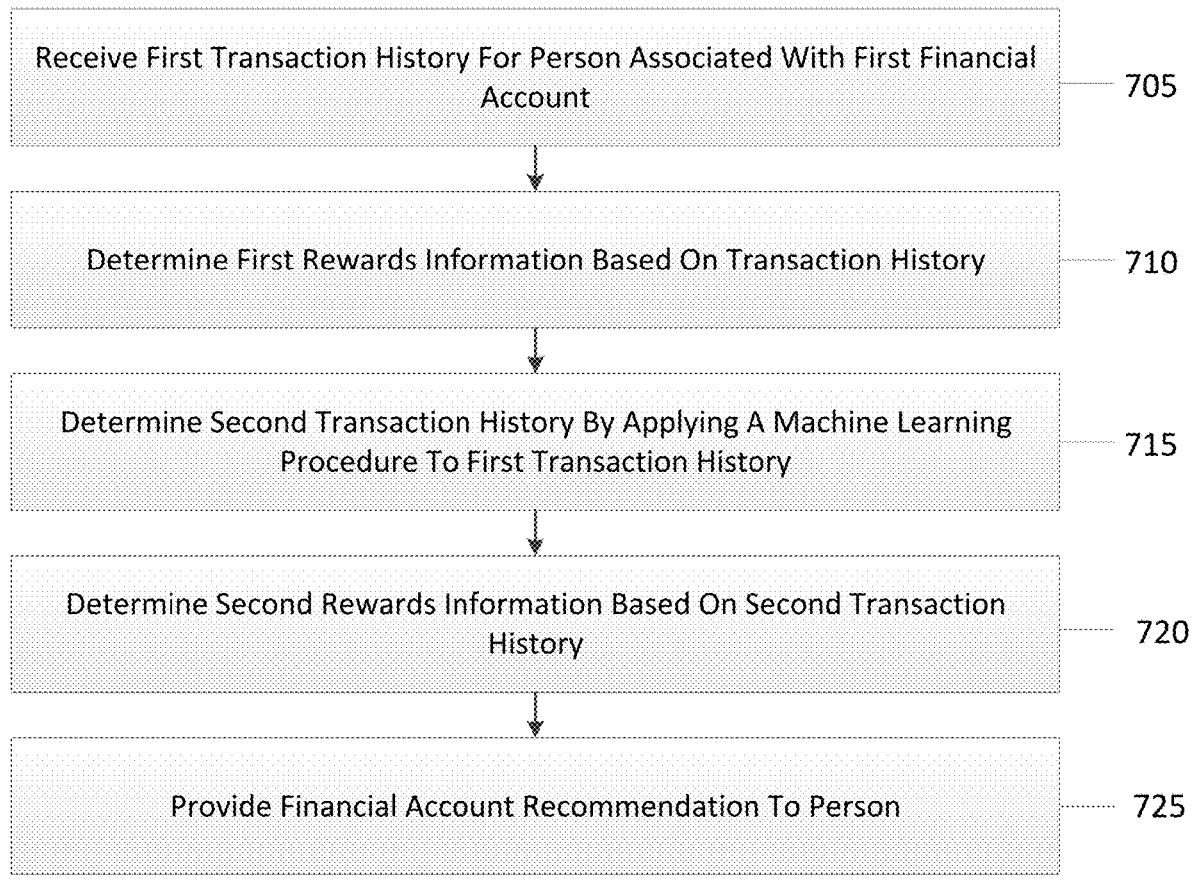
FIG. 7 is an exemplary flow diagram of a method for providing a financial account recommendation to a person according to an exemplary embodiment of the present disclosure.

FIG. 7 is a flow diagram of a method 700 for providing a financial account recommendation to a person according to an exemplary embodiment of the present disclosure. For example, at procedure 705, a first transaction history for the person associated with a first financial account can be received. At procedure 710, first rewards information can be determined based on the transaction history. At procedure 715, a second transaction history can be determined by applying a learning procedure to the first transaction history, where the second transaction history can include transactions likely to be made by the person in a future time period. At procedure 720, second rewards information can be determined based on the second transaction history. At procedure 725, a financial account recommendation can be provided to the person to (i) keep the first financial account or (ii) switch to a second financial account based on the first rewards information and the second rewards information.

Figure 8:
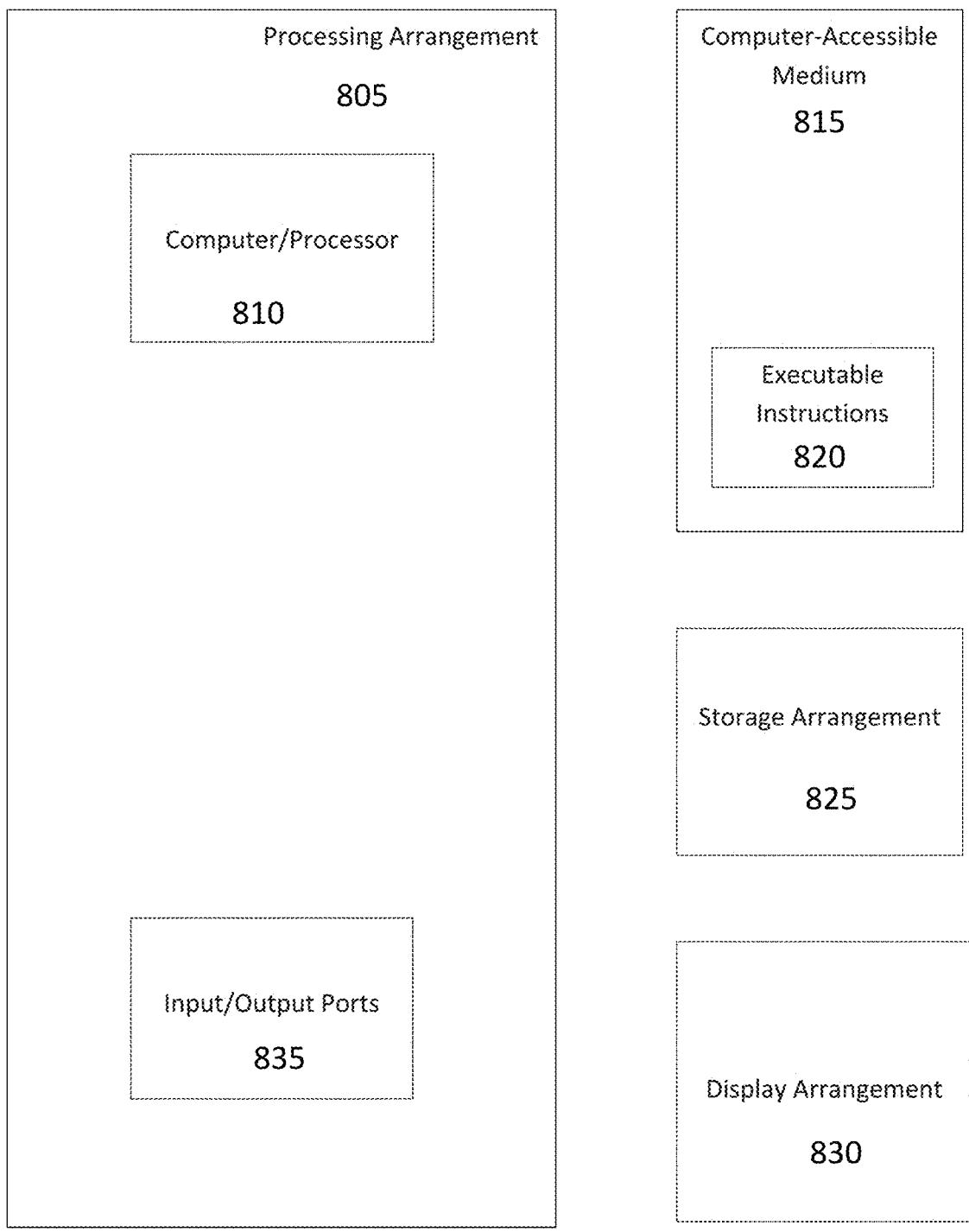
FIG. 8 is an illustration of an exemplary block diagram of an exemplary system in accordance with certain exemplary embodiments of the present disclosure.

FIG. 8 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 805. Such processing/computing arrangement 805 can be, for example entirely or a part of, or include, but not limited to, a computer/processor 810 that can include, for example one or more microprocessors, and use instructions stored on a computer-accessible medium (e.g., RAM, ROM, hard drive, or other storage device).

As shown in FIG. 8, for example a computer-accessible medium 815 (e.g., as described herein above, a storage device such as a hard disk, floppy disk, memory stick, CD-ROM, RAM, ROM, etc., or a collection thereof) can be provided (e.g., in communication with the processing arrangement 805). The computer-accessible medium 815 can contain executable instructions 820 thereon. In addition or alternatively, a storage arrangement 825 can be provided separately from the computer-accessible medium 815, which can provide the instructions to the processing arrangement 805 so as to configure the processing arrangement to execute certain exemplary procedures, processes, and methods, as described herein above, for example.

Further, the exemplary processing arrangement 805 can be provided with or include an input/output ports 835, which can include, for example a wired network, a wireless network, the internet, an intranet, a data collection probe, a sensor, etc. As shown in FIG. 8, the exemplary processing arrangement 805 can be in communication with an exemplary display arrangement 830, which, according to certain exemplary embodiments of the present disclosure, can be a touch-screen configured for inputting information to the processing arrangement in addition to outputting information from the processing arrangement, for example. Further, the exemplary display arrangement 830 and/or a storage arrangement 825 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions for providing a financial account recommendation to at least one person, wherein, when a computer arrangement executes the instructions, the computer arrangement is configured to perform procedures comprising:

receiving first information related to a first financial account receiving a first transaction history for the at least one person associated with the first financial account;

determining at least one benefit associated with the at least one first financial account initiating at least one Application Program Interface (API) call with at least one of (i) at least one travel account associated with the at least one person or (ii) at least one email account associated with the at least one person;

determining if the at least one benefit was used by the at least one person based on the at least one API call;

determining rewards information based on the determination of whether the at least one benefit was used;

determining first further rewards information based on the first transaction history;

accessing at least one database containing rewards rates for a plurality of second financial accounts;

determining second further rewards information for a particular second financial account of the plurality of second financial accounts based on the first transaction history.

applying a machine learning model to the first transaction history to determine a likely future spend;

determining second rewards information for a particular second financial account of the plurality of second financial accounts based on the likely future spend; and providing the financial account recommendation to the at least one person to switch to the second financial account based on a comparison of the first rewards information to the second rewards information.

2. The computer-accessible medium of claim 1, wherein the first financial account and the plurality of second financial accounts are credit card accounts.

3. The computer-accessible medium of claim 1, wherein the first financial account is associated with a first financial institution and the second financial account is associated with a second financial institution, and wherein the first financial institution is different than the second financial institution.

4. The computer-accessible medium of claim 1, wherein the computer arrangement is further configured to:
    determine a first financial cost associated with the first financial account and a second financial cost associated with the second financial account; and
    provide the financial account recommendation based on the first financial cost and the second financial cost.

5. The computer-accessible medium of claim 1, wherein the computer arrangement is further configured to:
    receive at least one financial statement from the at least one person; and
    generate the transaction history by performing an optical character recognition procedure on the at least one financial statement.

6. The computer-accessible medium of claim 1, wherein the computer arrangement is further configured to:
    initiate at least one call with a financial institution associated with the first financial account; and
    download the transaction history using the at least one API call.

7. The computer-accessible medium of claim 1, wherein the computer arrangement is further configured to determine a monetary value associated with the use of the at least one benefit.

8. The computer-accessible medium of claim 1, wherein the at least one travel account includes at least one of (i) an airline rewards account, (ii) a hotel rewards account, (iii) a car rental rewards account, or (iv) a taxi service rewards account.

9. The computer-accessible medium of claim 1, wherein the at least one benefit includes an enrollment in at least one trusted traveler program.

10. The computer-accessible medium of claim 1, wherein the computer arrangement is further configured to, prior to applying the machine learning model:
    receive, from the at least one database, a plurality of second transaction histories for the plurality of second financial accounts; and
    apply a machine learning procedure to the plurality of second transaction histories to generate the machine learning model.

11. The computer-accessible medium of claim 1, wherein the machine learning model comprises at plurality of factors including an income level associated with the at least one person and a type of job associated with the at least one person.

12. The computer-accessible medium of claim 11, wherein the machine learning model comprises at plurality of factors including a type of travel associated with the at least one person and a type of purchases associated with the at least one person.

13. A non-transitory computer-accessible medium having stored thereon computer-executable instructions for determining rewards information for at least one person, wherein, when a computer arrangement executes the instructions, the computer arrangement is configured to perform procedures comprising:
    receiving first information related to at least one first financial account associated with the at least one person;
    receiving a first transaction history for the at least one person associated with the at least one first financial account
    determining at least one benefit associated with the at least one first financial account;
    initiating at least one Application Program Interface (API) call with at least one of (i) at least one travel account associated with the at least one person or (ii) at least one email account associated with the at least one person;
    determining if the at least one benefit was used by the at least one person based on the at least one API call;
    determining the rewards information based on the determination of whether the at least one benefit was used;
    determining first further rewards information based on the first transaction history;
    accessing at least one database containing rewards information for a plurality of further financial accounts;
    determining second further rewards information for a particular further financial account of the plurality of further financial accounts based on the transaction history; and
    providing a financial account recommendation to the at least one person to switch to the further financial account based on (i) the rewards information and (ii) a comparison of the first further rewards information to the second further rewards information.

14. The computer-accessible medium of claim 13, wherein the computer arrangement is further configured to:
    determine a monetary value associated with the use of the at least one benefit; and
    determine the rewards information based on the monetary value.

15. The computer-accessible medium of claim 14, wherein the computer arrangement is further configured to:
    send a request to the at least one person for an updated monetary value based on an actual value received by the at least one person for the at least one benefit; and
    update the monetary value based on the updated monetary value.

16. The computer-accessible medium of claim 13, wherein the at least one travel account includes at least one of (i) an airline rewards account, (ii) a hotel rewards account, (iii) a car rental rewards account, or (iv) a taxi service rewards account.

17. The computer-accessible medium of claim 13, wherein the at least one benefit includes an enrollment in at least one trusted traveler program.

18. A non-transitory computer-accessible medium having stored thereon computer-executable instructions for providing a financial account recommendation to at least one person, wherein, when a computer arrangement executes the instructions, the computer arrangement is configured to perform procedures comprising:
    receiving first information related to a first financial account
    receiving a first transaction history for the at least one person associated with the first financial account;
    determining at least one benefit associated with the at least one first financial account
    initiating at least one Application Program Interface (API) call with at least one of (i) at least one travel account associated with the at least one person or (ii) at least one email account associated with the at least one person;

determining if the at least one benefit was used by the at least one person based on the at least one API call;

determining rewards information based on the determination of whether the at least one benefit was used;

determining first further rewards information based on the transaction history;

accessing at least one database containing rewards rates for a plurality of second financial accounts;

determining second further rewards information for a particular second financial account of the plurality of second financial accounts based on the first transaction history;

applying a machine learning model to the first transaction history to determine a likely future spend;

determining second rewards information based on the likely future spend; and providing the financial account recommendation to the at least one person to switch to a second financial account based on the first rewards information and the second rewards information.

19. The computer-accessible medium of claim 18, wherein the computer arrangement is further configured to:

review an actual spend by the at least one person for a time period; and determine the accuracy of the likely future spend by comparison to the actual spend.

20. The computer-accessible medium of claim 19, wherein the machine learning model comprises at plurality of factors including whether items are more likely to be repurchased or less likely to be repurchased.

* * * * *